(12) United States Patent
Bieniosek

(10) Patent No.: US 7,731,778 B2
(45) Date of Patent: Jun. 8, 2010

(54) SCRAP BALE FOR STEEL MAKING PROCESS

(75) Inventor: Thomas H. Bieniosek, Litchfield, OH (US)

(73) Assignee: Magnesium Technologies Corporation, Richfield, OH (US)

( * ) Notice: Subject to any disclaimer, the term of this patent is extended or adjusted under 35 U.S.C. 154(b) by 357 days.

(21) Appl. No.: 11/389,414

(22) Filed: Mar. 27, 2006

(65) Prior Publication Data

US 2007/0221012 A1 Sep. 27, 2007

(51) Int. Cl.
*C21B 3/02* (2006.01)
*C21C 7/04* (2006.01)

(52) U.S. Cl. .............................. 75/572; 75/316; 75/581

(58) Field of Classification Search ................... 75/303, 75/304, 313, 315, 316, 327, 458, 459, 507, 75/571, 572, 581; 423/152; 428/638, 663, 428/664; 29/403.2
See application file for complete search history.

(56) References Cited

U.S. PATENT DOCUMENTS

| | | | |
|---|---|---|---|
| 2,873,188 A | 2/1959 | Bieniosek et al. | |
| 3,598,573 A | 8/1971 | Freissmuth et al. | |
| 3,604,494 A | 9/1971 | Trager | |
| 3,637,373 A | 1/1972 | Bylund | |
| 3,674,444 A * | 7/1972 | Otani | 428/576 |
| 3,876,421 A | 4/1975 | Takemura | |
| 3,896,257 A | 7/1975 | Kinoshita | |
| 3,898,076 A * | 8/1975 | Ranke | 149/4 |
| 3,929,464 A | 12/1975 | Todd | |
| 3,955,973 A | 5/1976 | Robinson | |
| 3,985,545 A | 10/1976 | Kinoshita | |
| 3,998,625 A | 12/1976 | Koros | |
| 4,004,630 A | 1/1977 | Dunks | |
| 4,014,684 A | 3/1977 | Jones | |
| 4,040,818 A | 8/1977 | Clegg et al. | |
| 4,076,522 A | 2/1978 | Yoshida | |
| 4,078,915 A | 3/1978 | Meichsner | |
| 4,086,086 A | 4/1978 | Dawson et al. | |
| 4,137,072 A | 1/1979 | Kawakami et al. | |
| 4,139,369 A | 2/1979 | Kandler et al. | |
| 4,142,887 A | 3/1979 | Luyckx | |
| 4,154,605 A | 5/1979 | Freissmuth et al. | |

(Continued)

FOREIGN PATENT DOCUMENTS

EP 0724 018 7/1996

(Continued)

OTHER PUBLICATIONS

D. Schauwinhold et al. Steel, in Ullmann's Encyclopedia of Industrial Chemistry, vol. 25A, (1994), p. 284.*

(Continued)

*Primary Examiner*—George Wyszomierski
*Assistant Examiner*—Mark L Shevin
(74) *Attorney, Agent, or Firm*—Fay Sharpe LLP; Brian E. Turung

(57) ABSTRACT

A bale of ferrous scrap for use in a steel making process where the bale comprises a compacted volume of scrap with an external marginal layer surrounding a center portion of the bale and a package of elements formed from commingled flux being compacted into the center portion and encapsulated in the bale.

70 Claims, 7 Drawing Sheets

U.S. PATENT DOCUMENTS

| | | | |
|---|---|---|---|
| 4,169,724 A | 10/1979 | Freissmuth et al. | |
| 4,173,466 A | 11/1979 | McLaughlin et al. | |
| 4,194,902 A | 3/1980 | Gmohling et al. | |
| 4,208,207 A * | 6/1980 | El Gammal | 420/24 |
| 4,209,325 A | 6/1980 | Cooper | |
| 4,210,195 A | 7/1980 | McPherson et al. | |
| 4,224,069 A | 9/1980 | Shea et al. | |
| 4,230,490 A | 10/1980 | Kessl et al. | |
| 4,266,969 A | 5/1981 | Koros | |
| 4,274,869 A | 6/1981 | Kristiansen et al. | |
| 4,279,643 A | 7/1981 | Jackman | |
| 4,313,758 A | 2/1982 | Henning et al. | |
| 4,315,773 A | 2/1982 | Freissmuth et al. | |
| 4,345,940 A | 8/1982 | Koros | |
| 4,364,771 A | 12/1982 | Cordier et al. | |
| 4,374,664 A | 2/1983 | Mitsuo | |
| 4,385,030 A | 5/1983 | Dremann | |
| 4,392,887 A * | 7/1983 | Goedert | 75/535 |
| 4,395,282 A | 7/1983 | Braun et al. | |
| 4,540,436 A | 9/1985 | Wolfsgruber et al. | |
| 4,592,777 A | 6/1986 | Rellermyer et al. | |
| 4,600,434 A | 7/1986 | Kleimeyer et al. | |
| 4,705,561 A | 11/1987 | Green | |
| 4,708,737 A | 11/1987 | Skach, Jr. et al. | |
| 4,738,715 A | 4/1988 | Muller | |
| 4,764,211 A | 8/1988 | Meichsner et al. | |
| 4,765,830 A | 8/1988 | Skach, Jr. et al. | |
| 4,832,739 A | 5/1989 | Meichsner et al. | |
| 4,897,242 A | 1/1990 | Gut | |
| 4,900,375 A | 2/1990 | Alt | |
| 4,943,317 A | 7/1990 | Lischka | |
| 4,943,411 A | 7/1990 | Henych | |
| 5,021,086 A | 6/1991 | Lyudkx et al. | |
| 5,259,442 A | 11/1993 | Clark | |
| 5,284,504 A | 2/1994 | Barker | |
| 5,358,550 A | 10/1994 | Rossborough | |
| 5,366,539 A | 11/1994 | Abele | |
| 5,397,379 A | 3/1995 | Barker | |
| 5,972,072 A | 10/1999 | Kinsman | |
| 6,352,570 B1 | 3/2002 | Bieniosek | |
| 6,372,013 B1 * | 4/2002 | Trout et al. | 75/309 |
| 6,395,058 B2 | 5/2002 | Bieniosek et al. | |

FOREIGN PATENT DOCUMENTS

| | | |
|---|---|---|
| JP | 52-75608 | 6/1977 |
| JP | 55-085611 | 6/1980 |
| LU | 88252 | 1/1994 |

OTHER PUBLICATIONS

B. Mishra, Steelmaking practices and their influence on properties, in ASM Metal Handbook (1998).*

* cited by examiner

SCRAP BALE FOR STEEL MAKING PROCESS

Present invention relates to the art of producing low sulfur content steel for a steel making process and more particularly to a novel scrap bale used for creating low sulfur content steel.

BACKGROUND OF INVENTION

In producing molten steel, a steel mill normally employs either a basic oxygen furnace or an electric arc furnace. When using a basic oxygen furnace, molten pig iron and solid steel scrap are converted into steel of the desired carbon content and temperature using high purity oxygen. The furnace or converter is a barrel shaped, open topped, refractory lined vessel that can rotate about a horizontal trunnion axis. The operational steps of the process involve charging scrap into the vessel, followed by charging of hot molten pig iron onto the scrap. When charging is complete, oxygen is blown through a lance to remove silicon, carbon, and phosphorous from the molten pig iron. The scrap melts during the process, commingling with the molten pig iron to form a bath of liquid steel. This process raises the temperature of the liquid steel made from the scrap and hot metal to above 2850° F. Flux is charged into the vessel for the purpose of combining with the silicon and phosphorous originating from the molten pig iron, thereby forming a molten slag. This slag also absorbs sulfur originating from the molten pig iron and steel scrap. Scrap is an important constituent of the basic oxygen process because, as the scrap melts it absorbs the heat generated by the oxidation of carbon contained in the molten pig iron. In an electric arc furnace, it is quite common to use bales of steel scrap as the source of iron units to be melted. In both a basic oxygen process and an electric arc process, the use of steel scrap presents processing difficulties. Compacted bales of steel scrap with variable compositions are shipped to the steel mill from many locations.

Depending on the source of the scrap, there are different levels of sulfur in the scrap and there is no technique to determine exactly how much sulfur is in the steel of a compressed scrap bale. On the other hand, it is standard practice to desulfurize molten pig iron before it is used for steel making.

In a basic oxygen furnace, the scrap is about 25-30% of the charge. Large pieces of scrap, such as compressed bales, which are preferred for logistics and handling, melt at the end of the process. When the steel scrap is completely melted, the sulfur contained in the steel scrap is released into the bath. Removing this sulfur with the use of standard fluxes requires a substantial amount of time to assure that the molten metal is sufficiently desulfurized for subsequent use in steel making. Thus, using bales of scrap delays the steel making process by requiring a longer processing time for sulfur removal in the melting furnace. Increased time is costly and constitutes a disadvantage of using steel scrap. The steel mill desires to desulfurize the molten steel as fast as possible so that the molten metal is ready for use in a very short time. Ideally, the molten steel should be removed from the furnace as soon as the molten metal has reached the desired tapping temperature. If the sulfur content of the steel bath is too high at tap, then it must be removed downstream of the vessel in the steel ladle at significant expense with a large negative impact on productivity. There is a need for improving the melting process using bales of scrap steel so that the molten metal is rapidly desulfurized to allow tapping the molten metal essentially as soon as the steel scrap has melted. This can not be done with the present technology since significant amounts of sulfur are locked in the solidified steel of the scrap.

THE INVENTION

The invention is a technique for allowing substantially immediate use of the molten steel as soon as the scrap melts. To meet this objective, the molten steel is desulfurized by desulfurizing the scrap metal as it melts. Consequently, a lower sulfur content of the steel bath in the furnace is achieved. This is accomplished by a novel fluxing technique associated with the scrap metal used in a melting furnace.

In accordance with the present invention there is provided a bale of ferrous scrap for use in a steel making process. The bale comprises a compacted volume of scrap with an external marginal layer of scrap surrounding a center portion of the bale and a package of elements formed from commingled flux. The package is compacted into the center portion of the bale and is encapsulated in the bale by the exterior marginal layer of scrap. In accordance with another aspect of the invention, the commingled flux is a mass containing at least two particles selected from the class consisting of lime particles, aluminum particles, calcium aluminate particles, fluorspar particles and magnetic ferrous particles. The flux elements of the package are either compacted briquettes or agglomerated clumps of flux, each of which includes the commingled constituents of the flux used in removing sulfur from the molten metal. The basic flux is commingled particles. The flux includes 0-8% fluorspar particles, 0-40% magnetic ferrous particles, 10-40% aluminum powder or particles, 0-80% calcium aluminate particles and the rest lime powder or particles. Thus, the preferred flux involves lime and aluminum particles or calcium aluminate particles, with or without fluorspar and with or without magnetic ferrous particles. The flux melts before the scrap melts in the bales in the furnace and is highly basic with a high capacity for sulfur removal from the scrap steel forming the bales. The aluminum particles oxidize when the scrap bales are heated in the highly oxidizing environment of the furnace. The lime and oxidized aluminum combine to form calcium aluminate, a compound that has a high capacity for sulfur removal. Thus, the flux captures and removes the sulfur of the scrap metal. The heat generated by the oxidation of aluminum results in the lime forming a liquid calcium aluminate slag, together with the oxidized aluminum, before the steel scrap melts, to provide a liquid flux surrounding the scrap metal of the bale as it is being converted from a solid state to the liquid state. Alternately, the flux can consist of solid calcium aluminate particles which melt before the steel scrap does and combine with the lime present to form a liquid slag with a high capacity for sulfur removal. By using a small amount of fluorspar, the melting temperature of the flux is decreased so the flux melts more quickly. By adding magnetic ferrous particles, the resulting mixture can be made magnetic, facilitating handling by a magnet as the scrap bales are formed. Moreover, the use of oxidized magnetic ferrous particles would accelerate the subsequent oxidation of aluminum and liquid slag formation in the furnace. Thus, the bale of the present invention is a product including a scrap metal plus a captured flux package where the flux is formed into an element or body by being compacted together or agglomerated together. The flux is held within the bale as the scrap melts around the flux package.

In accordance with another aspect of the present invention there is provided a method of refining steel in a melting vessel. The method includes adding bales of ferrous scrap into the vessel, charging the vessel with molten iron, encapsulating a package of flux into the bale wherein the flux is commingled and in the form of discrete flux elements or bodies. Thereafter, the method involves melting the scrap into molten iron with flux removing sulfur from the scrap as it is being melted. The method can also involve pouring the molten metal from the vessel within ten minutes of the scrap being melted. The flux melts first and removes sulfur as the steel scrap subsequently melts and combines with the total heat within the vessel.

The primary object of the present invention is the provision of a novel bale of ferrous scrap, which bale has an internal package of elements or bodies formed from commingled flux. The package is compacted into the center portion of the bale and is encapsulated in the bale for subsequent use in a melting furnace.

Still a further object of the present invention is the provision of a scrap bale, as defined above, which scrap bale includes an encapsulated package of flux comprising commingled amount of lime and aluminum. In accordance with another aspect of this object, the flux also involves a compound to reduce the melting temperature of the flux so that the flux melts first and is, thus, available for reaction with the melting scrap steel in the bale.

Still a further object of the present invention is the provision of a method for refining steel in a heated vessel. The process involves adding bales of ferrous scrap into the vessel, and encapsulating a package of flux in the bale where the flux is commingled and in the form of discrete flux elements. Then, the flux removes sulfur from the scrap as the scrap melts.

These and other objects and advantages will become apparent from the following description taken together with the accompanying drawings.

PREFERRED EMBODIMENT

Figure 1:
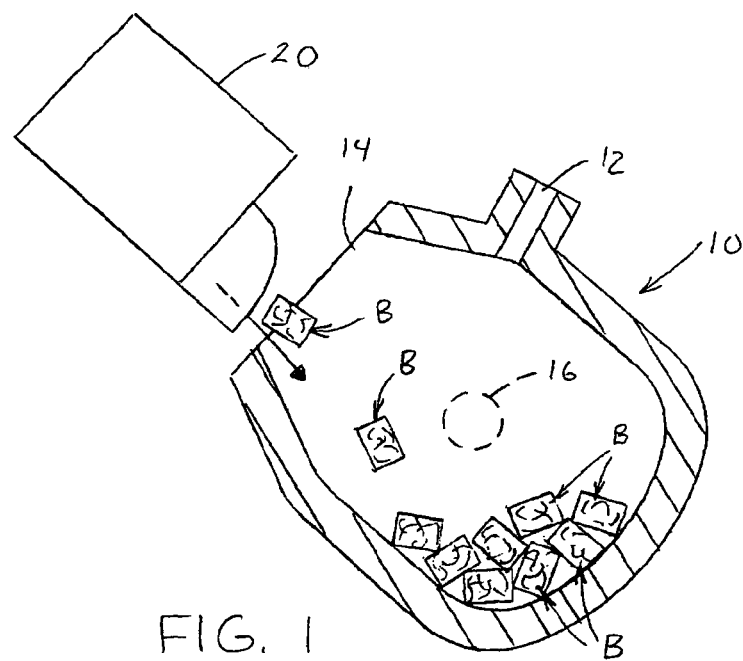
FIGS. 1-3 are schematic views of a prior art basic oxygen furnace showing the furnace being charged with scrap bales and then used to melt the scrap preparatory to using the molten metal.
Figure 2:
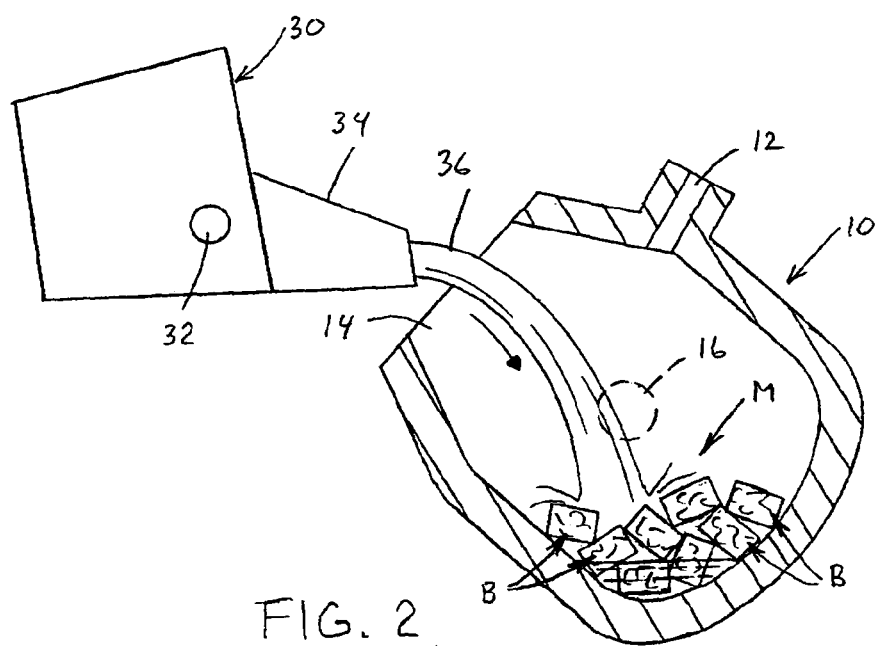
Figure 3:
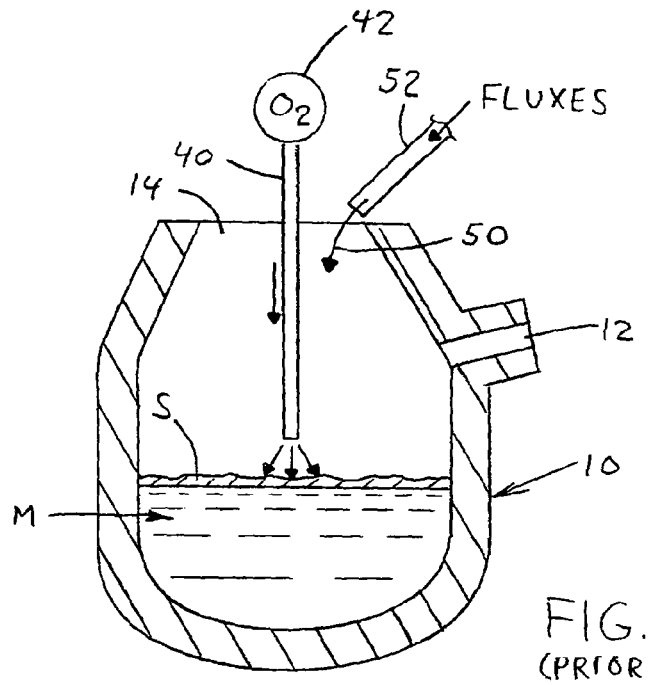

The invention relates to the steel making industry and is particularly applicable for use in a basic oxygen furnace as schematically illustrated in FIGS. 1-3. Basic oxygen furnace 10 is used to make discrete batches or heats of molten steel. Furnace or converter 10 is barrel shaped with taphole 13 and opened top or loading end 14. Refractory lined vessel 10 is rotated about horizontal trunnion 16 for moving the vessel or furnace from the position shown in FIG. 1 to the position shown in FIG. 3. This process involves the use of scrap steel usually formed into compacted bales B, which bales are provided from scrap box 20. The steel of bales B include an unknown amount of sulfur and have a size normally between 2.0 cubic feet and 20 cubic feet. In practice, the smaller bales are compacted cubes with 1.5 feet sides. Larger bales include a compacted shape having a square profile where each side is about 2.0 feet and the length is about 4.0 feet. Bales of the desired size are fed into vessel or furnace 10 by scrap box 20 as shown in FIG. 1. Thereafter, hot metal ladle 30 pivoted about trunnion 32 and including spout 34 directs molten iron 36 into the scrap load comprising a number of bales B. This procedure is illustrated in FIG. 2. Thus, the load of furnace 10 includes a lower mass M originally constituting an admixture of several bales B and molten iron 36. The iron has been desulfurized so the sulfur of mass M consists mainly of the unknown amount carried in the scrap of the bales B. As shown in FIG. 3, during oxygen blowing in vessel 10, bales B melt, so that mass M is a molten body M containing an unwanted amount of sulfur. During oxygen blowing water cooled lance 40 directs oxygen from supply 42 into molten metal mass M. Flux 50 is deposited into furnace 10 by way of chute 52. This flux normally contains burnt calcitic and dolomitic limes. To reduce the melting temperature of the flux, sometimes a certain amount of fluorspar is also included in flux 50. The purpose of this process using oxygen and flux 50 is to reduce the carbon in the molten metal mass M from about 4% to less than 1%. Indeed, it is often reduced to less than 0.2%. Furthermore, mass M is desulfurized to reduce or control the amount of sulfur in the molten metal prior to its use in a steel making process. Finally, furnace 10 raises the temperature of the liquid steel made from solid scrap and liquid hot metal to at least 2850° F. Since the level of sulfur in the scrap metal is not known, the heat or batch M often needs additional processing time to remove unanticipated levels of sulfur in the heat or batch M, requiring further additions of flux 50, as shown in FIG. 3. This extra processing needed for sulfur removal constitutes essentially unproductive use of furnace 10. The present invention is directed to an improvement in the process shown in FIGS. 1-3 to reduce the time necessary for holding the molten metal heat M to assure proper desulfurization of the heat before subsequent use in steel making.

The invention involves modifying bale B to reduce the necessary time to hold metal in the molten condition shown in FIG. 3 to reduce the sulfur content of mass M. The bale is modified by using an internal, captured package of flux produced in accordance with a procedure schematically illustrated in method 100 of FIG. 4. A supply 102 of bulk lime particles and a supply 104 of aluminum particles is used in method 100. As a further feature of the procedure, supply 106 of fluorspar particles is used to reduce the melting temperature of the resulting blended flux formed from the particles or powder in supplies 102, 104 and 106. Alternative ingredients may include magnetic ferrous particles 107 and calcium aluminate particles 108. These particles or powders are directed to mechanical mixer 110 by way of conveyors 102*a*, 104*a*, 106*a*, 107*a* and 108*a*. Mechanical mixer 110 blends the particles into a composite flux directed at a controlled rate along output 112 to a standard briquette compactor 120. In compactor 120 the blend of components constituting the flux are formed into briquettes or disks in accordance with standard, well known technology. Indeed, a flux blend has been formed into briquettes in the past. In the invention, the briquettes are directed through conveyor 120*a* to packaging station 130 where they are loaded into a bulk package P and sealed. These sealed packages, containing a large number of briquettes, is then directed by conveyor 132 to storage area 140 for subsequent use in the prior art process illustrated in FIGS. 1-3.

Figure 4:
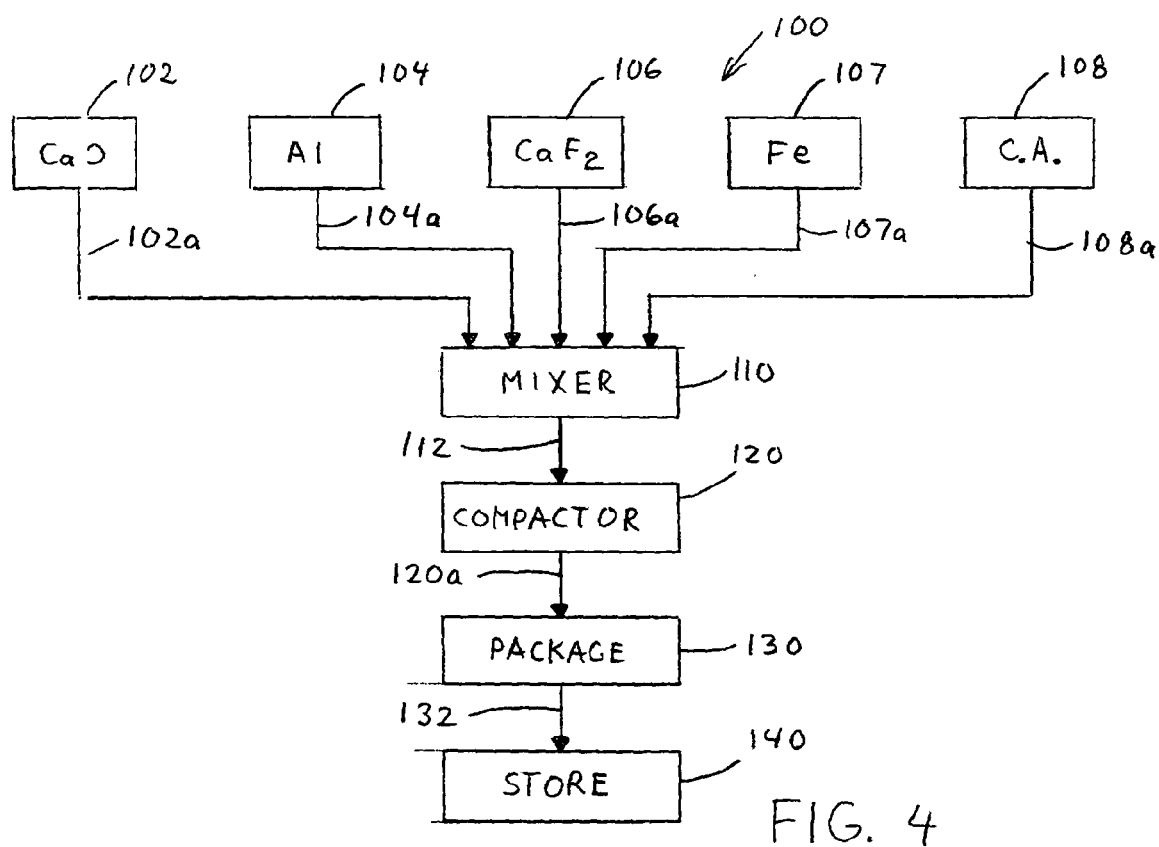
FIG. 4 is a block diagram or flow chart of a method used in accordance with the preferred embodiment of the present invention.
Figure 5:
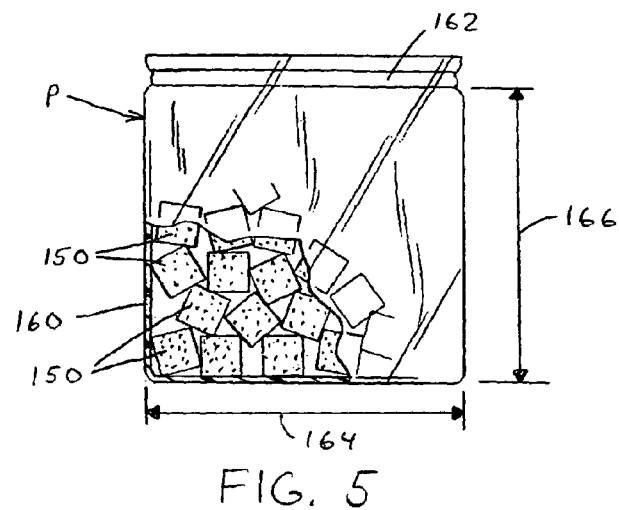
FIG. 5 is a partially cross-sectioned side elevational view of the package containing flux elements or bodies to be encapsulated in a scrap steel bale to make the preferred embodiment of the present invention.

Method 100 represented by the block diagram or flow chart of FIG. 4 produces novel package P shown in FIG. 5. This package includes elements 150 in the form of briquettes comprising the blended flux including a mixture of the constituents from supplies 102, 104, 106, 107 and 108. These briquettes are loaded in a container 160 sealed at top 162 for holding the briquettes as a group for subsequent storage and transportation. Package P includes a large number of briquettes 150 held together by a fairly strong plastic material constituting container 160. This container has various sizes, such as a generally flat shape with a width 164 which is about 1 foot and height 166 which is about 4 feet. The thickness is about 6 inches. Individual briquettes 150 are squares and have a size in the range of about 2 inch×2 inch with a thickness of about 0.5 inches. Other sizes of briquettes and packages are within the intent of the present invention. The sizes may vary according to the size of the scrap bales in which the packages P are incorporated.

Figure 6:
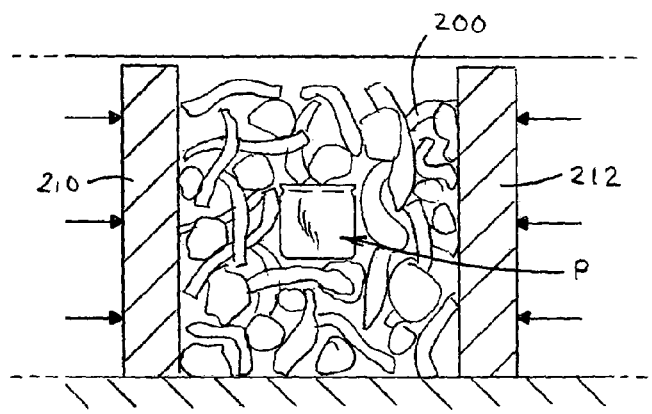
FIGS. 6 and 7 are schematic side elevational views illustrating the mechanism for compacting scrap steel into a bale constructed in accordance with the present invention.
Figure 7:
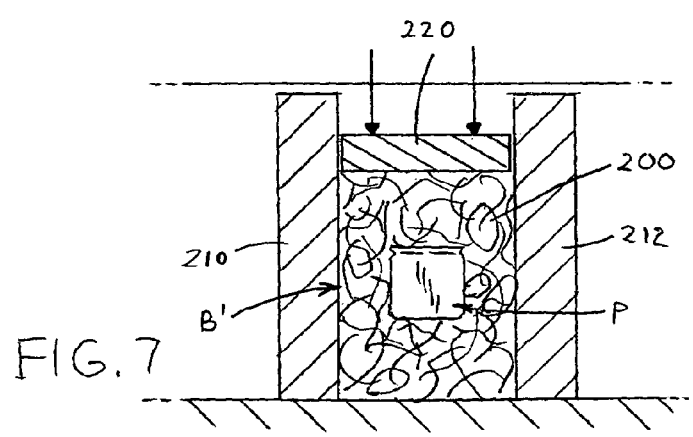
Figure 8:
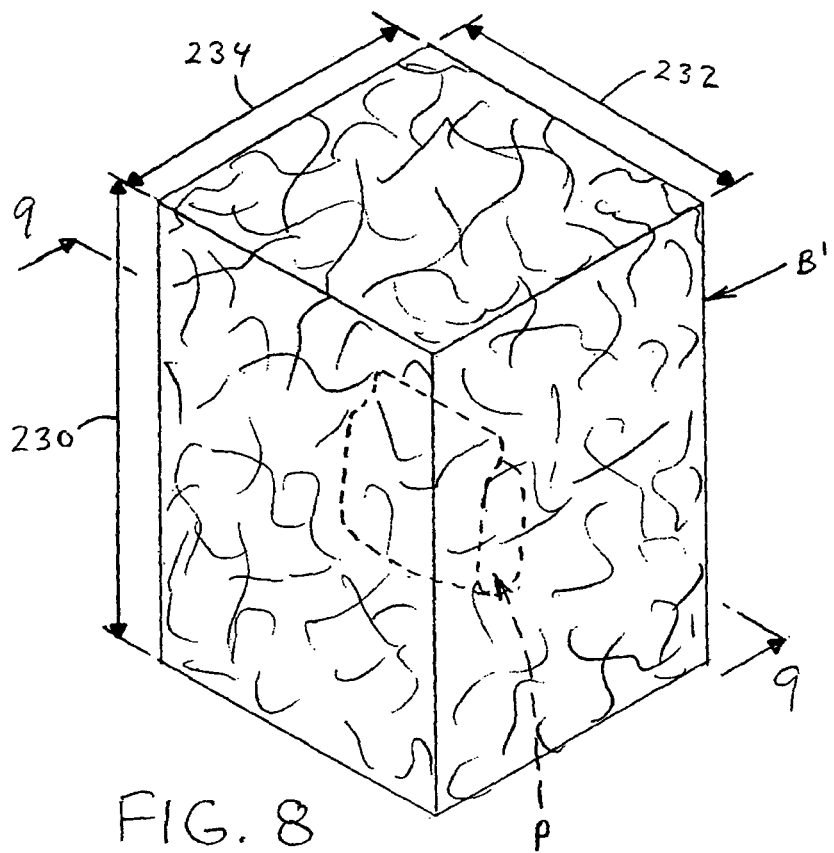
FIG. 8 is a pictorial view showing the preferred embodiment of the present invention.
Figure 9:
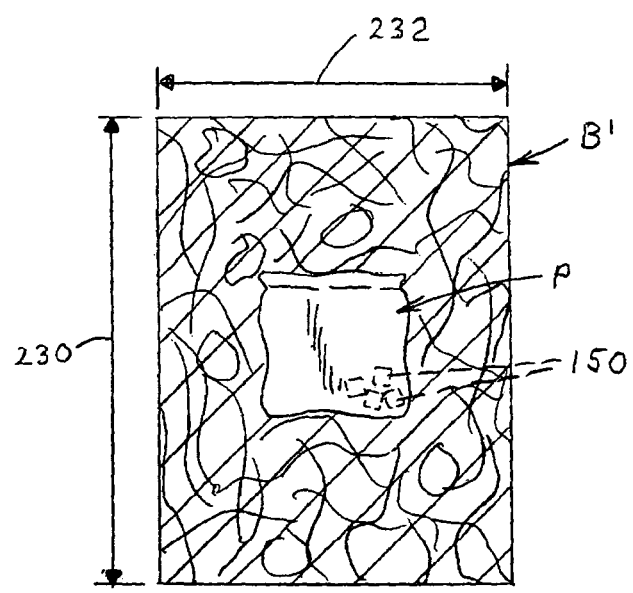
FIG. 9 is a cross-sectional view taken generally along line 9-9 of FIG. 8.

After method 100 shown in FIG. 4 produces package P as schematically illustrated in FIG. 5, this package is used in the center of a scrap bale compacted as schematically illustrated in FIGS. 6 and 7. In FIG. 6, package P is surrounded by scrap 200. Transversely movable compacting rams, 210, 212 compact scrap 200 around package P in one transverse direction. Another set of rams compact scrap 200 in the orthogonal transverse direction. Thereafter, ram 220 forces scrap 200 downwardly as illustrated in FIG. 7 to form a compact bale B' wherein package P of elements 150 is compacted in the center portion of the bale. Scrap 200 encapsulates package P in the center portion of the bale as best shown in FIGS. 8 and 9. Bale B' has height 230, width 232 and depth 234. In practice, a large bale has a 2 foot width 232 and a 2 foot depth 234. The height 230 is about 4 feet. Package P has dimensions as schematically illustrated in FIG. 5. The package can be circular, but is preferably somewhat flat as schematically illustrated in FIG. 8. The invention involves both novel package P and novel bale B' having an encapsulated package P where scrap 200 forms an outer marginal layer of compacted steel.

Figure 10:
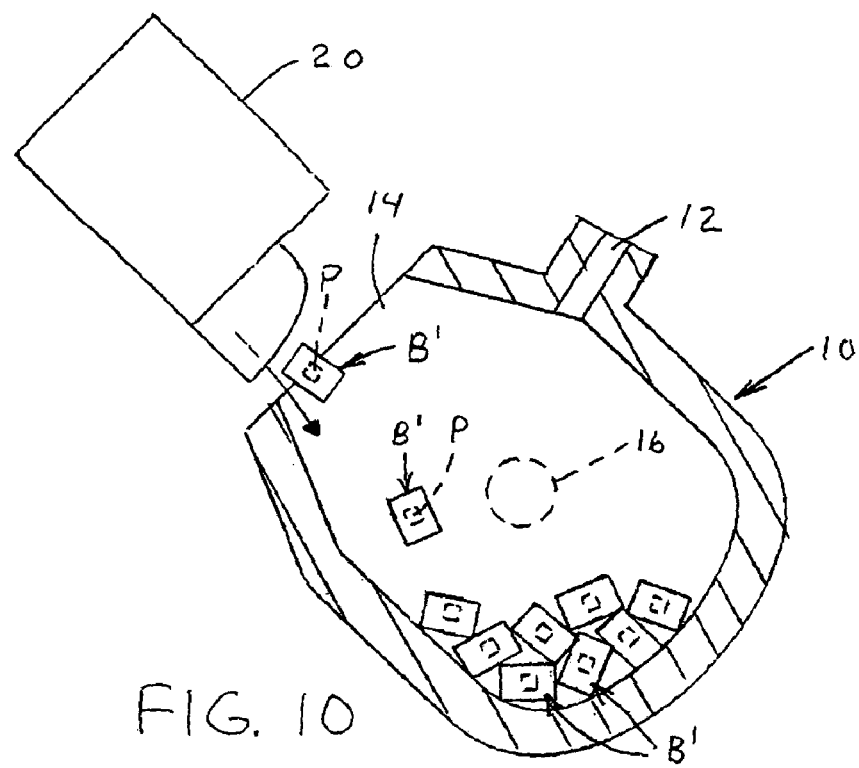
FIGS. 10 and 11 are side elevational views of the basic oxygen furnace performing the processes shown in the prior art representation of FIGS. 1 and 2 respectively.
Figure 11:
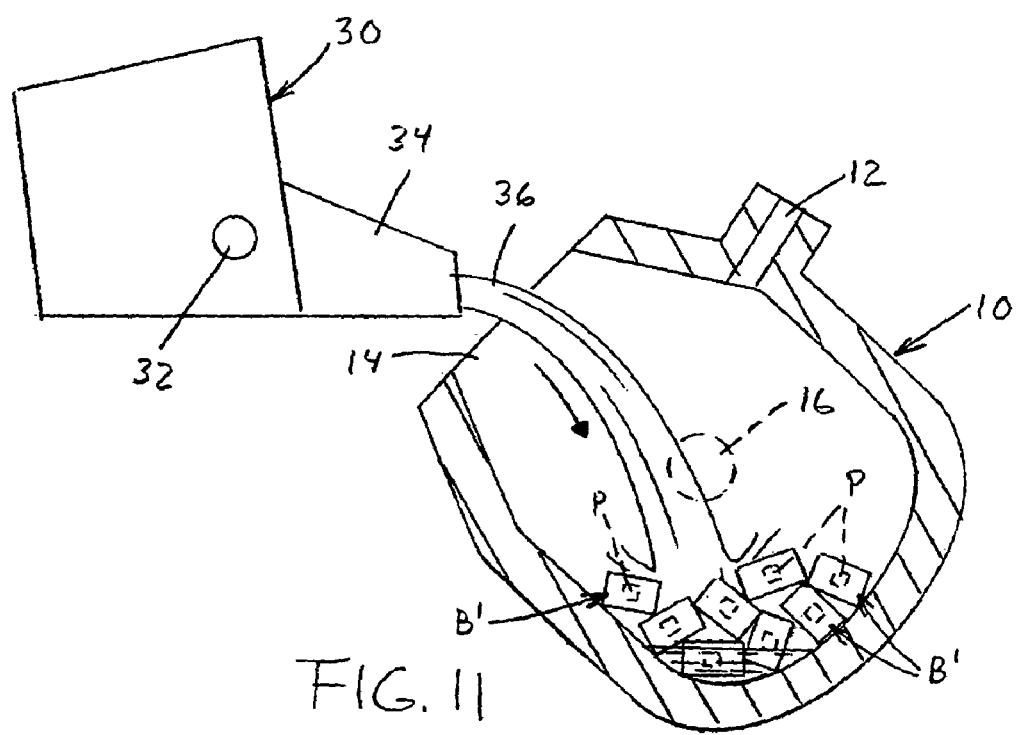

As shown in FIGS. 10 and 11, the prior art melting process illustrated in FIGS. 1-3 is changed by using novel scrap metal bale B' instead of prior art bale B. The process remains essentially the same. After the novel bales are charged into furnace 10, molten pig iron 36 is loaded into open end 14 to cover the many scrap bales B'. Then, oxygen is used, as shown in FIG. 3. As bales B' are heated, the aluminum contained in elements 150 of package P oxidize and combine with the lime contained in elements 150, forming a calcium aluminate compound which melts before the steel scrap of the bale melts. Fluorspar in the elements 150 of package P causes a lower melting temperature for the molten calcium aluminate in elements 150. Thus, flux comprising elements 150 melts first and is available as scrap steel 200 melts. As soon as the scrap is melted, the molten flux rapidly removes the sulfur content of the scrap steel. Consequently, the desulfurization of the molten scrap occurs as the scrap is melted. The scrap does not need to melt and then mix with molten metal 36 before desulfurization commences. In this manner, desulfurization of the molten metal mass M formed from metal 36 and bales B' occurs very quickly and essentially at the time the steel of the bales is melted. By using this modified scrap bale, the molten mass in furnace 10 is ready to be tapped as soon as the desired tapping temperature has been reached. This is a substantial advance in the steel making process. This same advance is obtained when using bales B' in an electric arc furnace, wherein only scrap steel is used for the metal being melted. As soon as the scrap is melted, it is desulfurized and ready to be tapped. In the prior art electric arc process, the scrap steel is first melted and then desulfurized by external application of flux 50 in a manner similar to the process shown in FIG. 3. Thus, the invention is an improvement in any melting process using scrap steel. It can be used in both a basic oxygen furnace as shown in FIGS. 10 and 11 and in an electric arc furnace.

Figure 12:
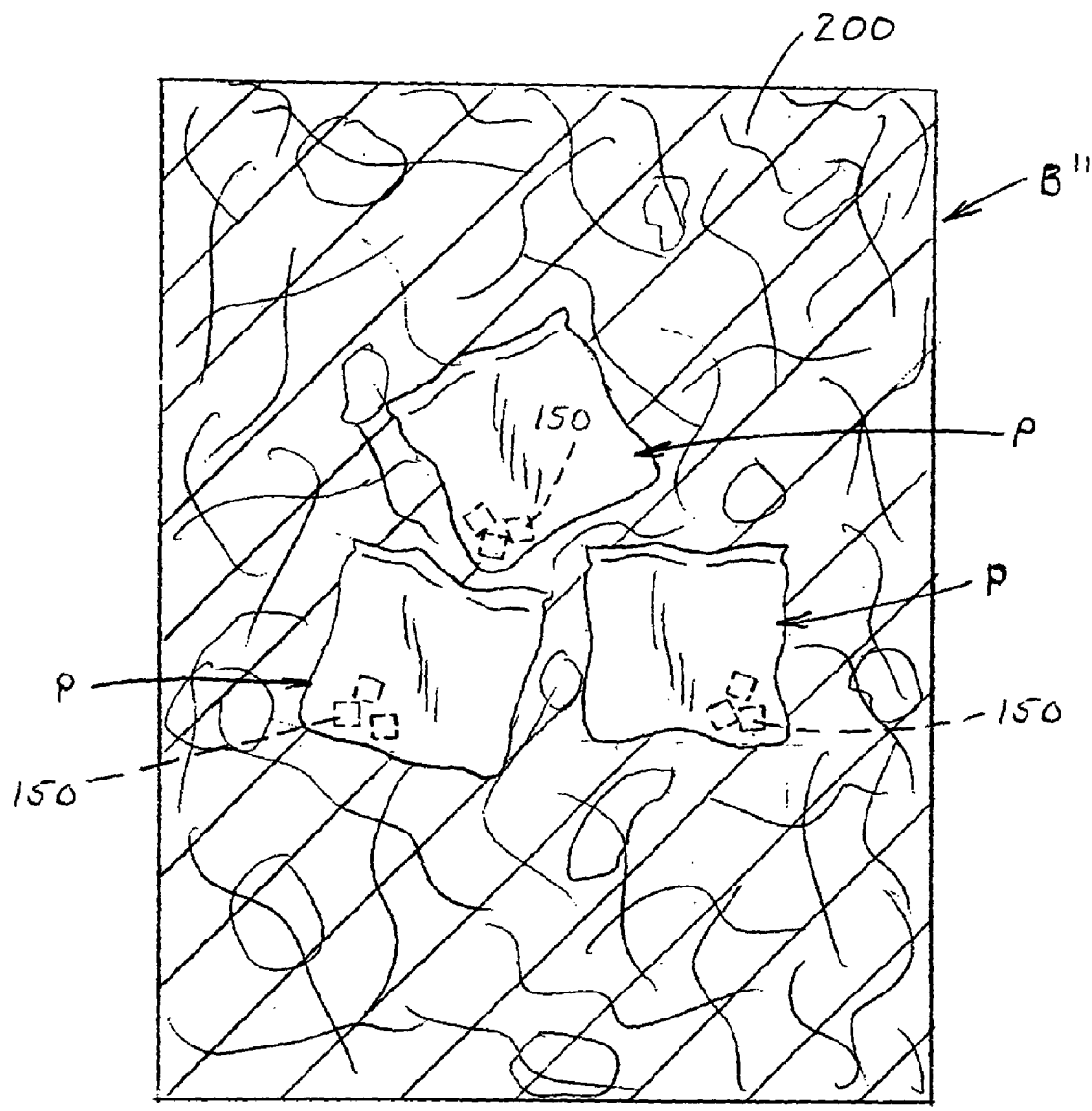
FIG. 12 is a view similar to FIG. 9 showing a modification of the preferred embodiment of the present invention.

In the preferred embodiment of the present invention bale B', as shown in FIGS. 8 and 9, employ a relatively large package P that fills approximately 10-25% of the volume of the bale. In accordance with an alternative embodiment shown in FIG. 12, bale B" includes three smaller packages P spaced throughout the center portion of the bale and surrounded by scrap steel 200. By using three smaller packages, the same volume of flux is incorporated into the center portion of the compacted scrap bale. In this manner, a smaller package P is produced to accommodate small bales or larger bales. The size of the bale determines the number of packages P used. It is not necessary to produce a small package P for a smaller scrap bale and a larger package P for a larger scrap bale. Consequently, a single size is available for different sizes of bales. The disclosure of the optional embodiment in FIG. 12 illustrates the concept that the flux is internal of the bale and can be provided by a plurality or a single source unit.

Figure 13:
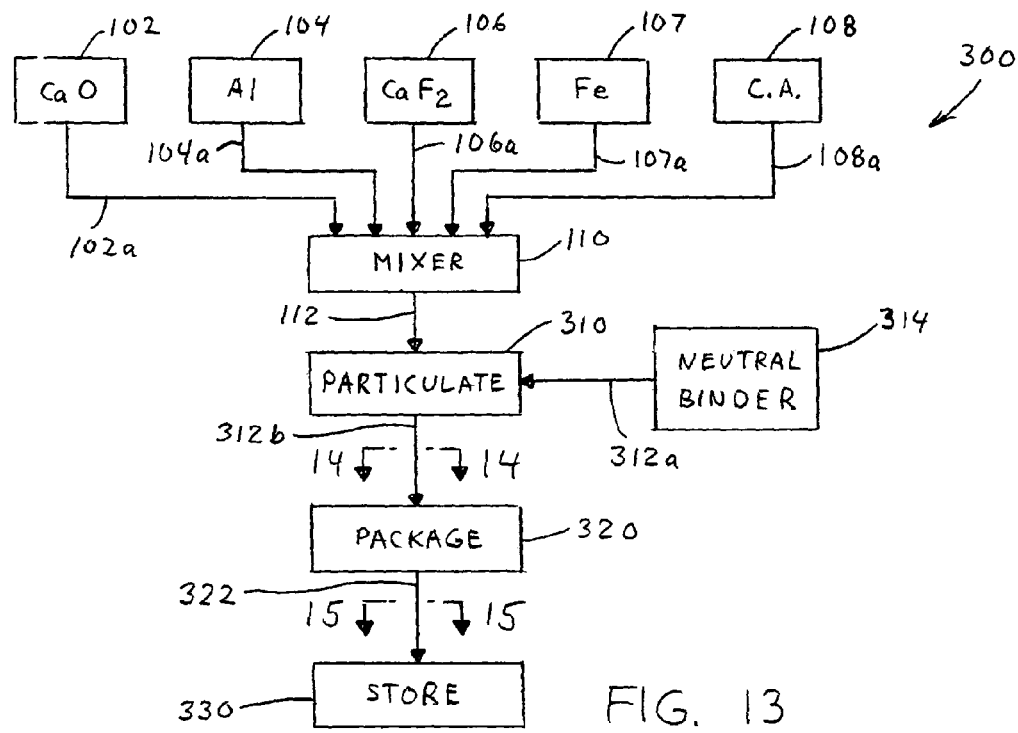
FIG. 13 is a block diagram or flow chart similar to FIG. 4 illustrating a modification of the preferred embodiment of the present invention.
Figure 14:
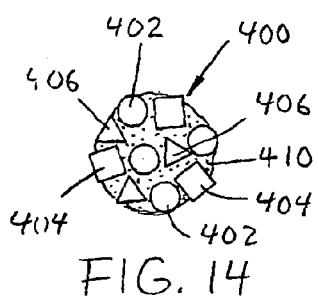
FIG. 14 is an enlarged view of an agglomerated clump of flux particles viewed generally along line 14-14 of FIG. 13; and, FIG. 15 is an enlarged partially cross-sectioned view similar to FIG. 5 illustrating a modification of the preferred embodiment produced by using the process illustrated in FIG. 13 and viewed generally along line 15-15 of FIG. 13.
Figure 15:
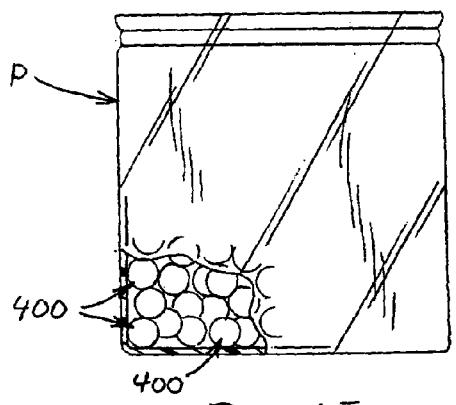

The elements 150 of package P are preferably a blended flux compound formed into briquettes. In an alternative embodiment of the invention, the blended flux compounds are merely agglomerated into clumps or agglomerated elements, as made by the alternative method 300 shown in the flow chart of FIG. 13. In this flow chart, the blended flux of mixer 110 is produced at output 112. Thereafter, the blended flux compounds are particulated by a standard device 310 using a neutral binder from supply 314, as indicated by inlet line 312*a*. The binder is combined with the blended flux composition to produce an agglomerated composite particle 400 schematically illustrated in FIG. 14. These particles are formed by device 310 and provided by outlet line 312*b*. The flux elements in package P are an agglomerated clump of lime 402, aluminum 404, and/or fluorspar 406, and/or magnetic ferrous particles 407, and/or calcium aluminate 408 held together by binder 410. The clumps are not round, as illustrated in FIG. 14, but are irregular and comprise a varied amount of the blended flux. The blended flux involves 0-8% fluorspar, and/or magnetic ferrous particles, 0-40% aluminum powder or particles 0-80% calcium aluminate particles and the rest lime particles. The symmetric configuration of element 400 in FIG. 14 is provided as a schematic representation of the element or body produced by device 310. Thereafter, the agglomerated elements or clumps of flux are loaded into package P at station 320, corresponding to station 130 in FIG. 4. The loaded and sealed package P is the same as the package for briquettes 150, but it includes agglomerated clumps 400. These packages are stored at area 330 corresponding to area 140 of FIG. 4 for subsequent use of the package P as illustrated in FIGS. 10 and 11. Other methods could be used for providing the elements of blended flux material loaded into package P. The preferred embodiment of element 150 is a briquette and one optional element is an agglomerated clump.

The invention has been described in connection with use of scrap for steel making in a basic oxygen furnace and in an electric arc furnace. However, bales B' and B", or modifications thereof, can be used in any steel making process where bales of scrap steel are charged and melted.

Having thus defined the invention the following is claimed:

1. A bale of ferrous scrap for use in a steel making process, said bale comprising a compacted volume of metal scrap and at least one cavity that is fully encapsulated by said metal scrap, at least one of said cavities including commingled flux, said commingled flux designed to remove sulfur from said metal scrap when said metal scrap melts during the steel making process, said commingled flux including lime particles, said commingled flux further includes particles selected from the group consisting of aluminum particles, calcium aluminate particles, fluorspar particles, and ferrous particles, said commingled flux is in a form of a compacted briquette, a compacted disk, an agglomeration of particles bound together by a binder, and mixture thereof.

2. The bale of ferrous scrap as defined in claim 1, wherein said commingled flux includes at least one particle type selected from the group consisting of aluminum particles, calcium aluminate particles, and mixtures thereof, said commingled flux including up to 40 weight percent aluminum particles, up to 80 weight percent calcium aluminate particles, 0-8 weight percent fluorspar particles, and 0-40 weight percent ferrous particles.

3. The bale of ferrous scrap as defined in claim 2, wherein said commingled flux further includes up to 8 weight percent fluorspar particles, and at least one particle type selected from the group consisting of aluminum particles, calcium aluminate particles, and mixtures thereof, said commingled flux including up to 40 weight percent aluminum particles and up to 80 weight percent calcium aluminate particles.

4. The bale of ferrous scrap as defined in claim 3, wherein said commingled flux consists of lime, fluorspar, ferrous particles, and at least one particle type selected from the group consisting of aluminum particles, calcium aluminate particles, and mixtures thereof, said commingled flux including up to 40 weight percent aluminum particles, up to 80 weight percent calcium aluminate particles, up to 8 weight percent fluorspar particles, and up to 40 weight percent ferrous particles.

5. The bale of ferrous scrap as defined in claim 1, wherein said bale has a volume of 3.0-20.0 cubic feet.

6. The bale of ferrous scrap as defined in claim 2, wherein said bale has a volume of 3.0-20.0 cubic feet.

7. The bale of ferrous scrap as defined in claim 3, wherein said bale has a volume of 3.0-20.0 cubic feet.

8. The bale of ferrous scrap as defined in claim 4, wherein said bale has a volume of 3.0-20.0 cubic feet.

9. The bale of ferrous scrap as defined in claim 1, including a container that contains a plurality of briquettes of said commingled flux, a plurality of said compacted disks, and combinations thereof, said container positioned in said at least one cavity of said bale.

10. The bale of ferrous scrap as defined in claim 2, including a container that contains a plurality of briquettes of said commingled flux, a plurality of said compacted disks, and combinations thereof, said container positioned in said at least one cavity of said bale.

11. The bale of ferrous scrap as defined in claim 3, including a container that contains a plurality of briquettes of said commingled flux, a plurality of said compacted disks, and combinations thereof, said container positioned in said at least one cavity of said bale.

12. The bale of ferrous scrap as defined in claim 8, including a container that contains a plurality of briquettes of said commingled flux, a plurality of said compacted disks, and combinations thereof, said container positioned in said at least one cavity of said bale.

13. The bale of ferrous scrap as defined in claim 9, wherein said container is a plastic container.

14. The bale of ferrous scrap as defined in claim 10, wherein said container is a plastic container.

15. The bale of ferrous scrap as defined in claim 11, wherein said container is a plastic container.

16. The bale of ferrous scrap as defined in claim 12, wherein said container is a plastic container.

17. The bale of ferrous scrap as defined in claim 1, wherein said commingled flux constitutes 10-25% of a total volume of said bale.

18. The bale of ferrous scrap as defined in claim 16, wherein said commingled flux constitutes 10-25% of a total volume of said bale.

19. The bale of ferrous scrap as defined in claim 9, wherein said at least one cavity of said bail including a plurality of said containers that include said commingled flux.

20. The bale of ferrous scrap as defined in claim 13, wherein said at least one cavity of said bail including a plurality of said containers that include said commingled flux.

21. The bale of ferrous scrap as defined in claim 10, wherein said at least one cavity of said bail including a plurality of said containers that include said commingled flux.

22. The bale of ferrous scrap as defined in claim 11, wherein said at least one cavity of said bail including a plurality of said containers that include said commingled flux.

23. The bale of ferrous scrap as defined in claim 18, wherein said at least one cavity of said bail including a plurality of said containers that include said commingled flux.

24. A method of refining steel in a heated vessel, said method including:
    a) adding at least one bale of ferrous scrap into said vessel, said bale comprising a compacted volume of metal scrap and at least one cavity that is fully encapsulated by said metal scrap, at least one of said cavities including commingled flux, said commingled flux designed to remove sulfur from said metal scrap when said metal scrap melts during a steel making process, said commingled flux including lime particles, said commingled flux further includes particles selected from the group consisting of aluminum particles, calcium aluminate particles, fluorspar particles, and ferrous particles, said commingled flux is in a form of a compacted briquette, a compacted disk, an agglomeration of particles bound together by a binder, and mixtures thereof;
    b) charging said vessel with molten iron; and,
    c) melting said at least one bale of ferrous scrap into said molten iron to cause said commingled flux in said at least one bale of ferrous scrap to remove sulfur from said molten iron, said melted bale of ferrous scrap, and combination thereof, said commingled flux formulated to at least partially melt and form a slag prior to said ferrous scrap about said at least one cavity melting.

25. The method as defined in claim 24, wherein said commingled flux includes at least one particle type selected from the group consisting of aluminum particles, calcium aluminate particles, and mixtures thereof, said commingled flux including up to 40 weight percent aluminum particles, up to 80 weight percent calcium aluminate particles, 0-8 weight percent fluorspar particles, and 0-40 weight percent ferrous particles.

26. The method as defined in claim 25, wherein said commingled flux further includes up to 8 weight percent fluorspar particles, and at least one particle type selected from the group consisting of aluminum particles, calcium aluminate particles, and mixtures thereof, said commingled flux including up to 40 weight percent aluminum particles and up to 80 weight percent calcium aluminate particles.

27. The method as defined in claim 24, wherein said at least one cavity of said bale of scrap includes a container that contains a plurality of briquettes of said commingled flux, a plurality of said compacted disks, and combinations thereof.

28. The method as defined in claim 26, wherein said at least one cavity of said bale of scrap includes a container that contains a plurality of briquettes of said commingled flux, a plurality of said compacted disks, and combinations thereof.

29. The method as defined in claim 27, wherein said container is a plastic container.

30. The method as defined in claim 28, wherein said container is a plastic container.

31. The method as defined in claim 29, wherein said at least one cavity of said bail including a plurality of said containers that include said commingled flux.

32. The method as defined in claim 30, wherein said at least one cavity of said bail including a plurality of said containers that include said commingled flux.

33. A bale of ferrous scrap for use in a steel making process, said bale having a volume of 3.0-20.0 cubic feet, said bale comprising ferrous scrap and commingled flux, said ferrous scrap compact about said commingled flux such that said compacted ferrous scrap fully encapsulates said commingled flux, said commingled flux designed to remove sulfur from said compacted metal scrap when said compacted metal scrap melts during the steel making process, said commingled flux constituting 10-25% of a total volume of said bale, said commingled flux including lime and at least one material selected from the group consisting of aluminum particles and calcium aluminate particles, said commingled flux is in a form of a plurality of compacted briquets, a plurality of compacted disks, and combinations thereof prior to said commingled flux being compacted within said ferrous scrap.

34. The bale as defined in claim 33, wherein said commingled flux consists essentially of 10-40 weight percent aluminum particles, up to 80 weight percent calcium aluminate particles and the balance lime.

35. The bale as defined in claim 33, wherein said commingled flux consists essentially of 10-40 weight percent aluminum particles, up to 8 weight percent fluorspar particles, up to 40 weight percent magnetic ferrous particles, up to 80 weight percent calcium aluminate particles, lime constituting a balance of said commingled flux.

36. The bale as defined in claim 34, wherein said commingled flux positioned in a center portion of said bale.

37. The bale as defined in claim 35, wherein said commingled flux positioned in a center portion of said bale.

38. The bale as defined in claim 36, wherein said commingled flux is contained in and sealed in a container, said container design to be combined with said ferrous scrap prior to said ferrous scrap being compacted about said commingled flux.

39. The bale as defined in claim 37, wherein said commingled flux is contained in and sealed in a container, said container design to be combined with said ferrous scrap prior to said ferrous scrap being compacted about said commingled flux.

40. The bale as defined in claim 38, wherein said container includes a plurality of compacted briquets, a plurality of compacted disks, and combinations thereof.

41. The bale as defined in claim 39, wherein said container includes a plurality of compacted briquets, a plurality of compacted disks, and combinations thereof.

42. The bale as defined in claim 40, wherein said container is a plastic container.

43. The bale as defined in claim 41, wherein said container is a plastic container.

44. The bale as defined in claim 42, wherein a plurality of said plastic containers containing said commingled flux is combined with said ferrous scrap prior to said ferrous scrap being compacted about said plurality of plastic containers.

45. The bale as defined in claim 43, wherein a plurality of said plastic containers containing said commingled flux is combined with said ferrous scrap prior to said ferrous scrap being compacted about said plurality of plastic containers.

46. A method of refining steel in a heated vessel, said method including:
   a) adding at least one bale of ferrous scrap into said vessel, said bale having a volume of 3.0-20.0 cubic feet, said bale comprising ferrous scrap and commingled flux, said ferrous scrap compact about said commingled flux such that said compacted ferrous scrap fully encapsulates said commingled flux, said commingled flux designed to remove sulfur from said compacted metal scrap when said compacted metal scrap melts during the steel making process, said commingled flux constituting 10-25% of a total volume of said bale, said commingled flux including lime and at least one material selected from the group consisting of aluminum particles and calcium aluminate particles, said commingled flux is in a form of a plurality of compacted briquets, a plurality of compacted disks, and combinations thereof prior to said commingled flux being compacted within said ferrous scrap;
   b) charging said vessel with molten iron; and,
   c) melting said at least one bale of ferrous scrap into said molten iron so cause said commingled flux in said at least one bale of ferrous scrap to remove sulfur from said molten iron, said melted bale of ferrous scrap, and combinations thereof.

47. The method as defined in claim 46, wherein said commingled flux is formulated to melt and form a slag in said cavity of said bale prior to said compacted ferrous scrap about said cavity fully melting.

48. The method as defined in claim 47, wherein said commingled flux consists essentially of 10-40 weight percent aluminum particles, up to 80 weight percent calcium aluminate particles and the balance lime.

49. The method as defined in claim 48, wherein said commingled flux consists essentially of 10-40 weight percent aluminum particles, up to 8 weight percent fluorspar particles, up to 40 weight percent magnetic ferrous particles, up to 80 weight percent calcium aluminate particles, lime constituting a balance of said commingled flux.

50. The method as defined in claim 48, wherein said commingled flux positioned in a center portion of said bale.

51. The method as defined in claim 49, wherein said commingled flux positioned in a center portion of said bale.

52. The method as defined in claim 50, wherein said commingled flux is contained in and sealed in a container, said container designed to be combined with said ferrous prior to said ferrous scrap being compacted about said commingled flux.

53. The method as defined in claim 51, wherein said commingled flux is contained in and sealed in a container, said container designed to be combined with said ferrous prior to said ferrous scrap being compacted about said commingled flux.

54. The method as defined in claim 52, wherein said container includes a plurality of compacted briquets, a plurality of compacted disks, and combinations thereof.

55. The method as defined in claim 53, wherein said container includes a plurality of compacted briquets, a plurality of compacted disks, and combinations thereof.

56. The method as defined in claim 54, wherein said container is a plastic container.

57. The method as defined in claim 55, wherein said container is a plastic container.

58. The method as defined in claim 56, wherein a plurality of said plastic containers containing said commingled flux is combined with said ferrous scrap prior to said ferrous scrap being compacted about said plurality of plastic containers.

59. The method as defined in claim 57, wherein a plurality of said plastic containers containing said commingled flux is combined with said ferrous scrap prior to said ferrous scrap being compacted about said plurality of plastic containers.

60. The bale of ferrous scrap as defined in claim 1, wherein said commingled flux includes lime, fluorspar, magnetic ferrous particles and one or more particles selected from the group consisting of aluminum particles and calcium aluminate particles.

61. The bale of ferrous scrap as defined in claim 23, wherein said commingled flux includes lime, fluorspar, magnetic ferrous particles and one or more particles selected from the group consisting of aluminum particles and calcium aluminate particles.

62. The method as defined in claim 24, wherein said commingled flux includes lime, fluorspar, magnetic ferrous particles and one or more particles selected from the group consisting of aluminum particles and calcium aluminate particles.

63. The method as defined in claim 31, wherein said commingled flux includes lime, fluorspar, magnetic ferrous particles and one or more particles selected from the group consisting of aluminum particles and calcium aluminate particles.

64. The method as defined in claim 32, wherein said commingled flux includes lime, fluorspar, magnetic ferrous particles and one or more particles selected from the group consisting of aluminum particles and calcium aluminate particles.

65. The bale of ferrous scrap as defined in claim 33, wherein said commingled flux includes lime, fluorspar, magnetic ferrous particles and one or more particles selected from the group consisting of aluminum particles and calcium aluminate particles.

66. The bale of ferrous scrap as defined in claim 44, wherein said commingled flux includes lime, fluorspar, magnetic ferrous particles, 10-40 weight percent aluminum particles, and optionally calcium aluminate particles.

67. The bale of ferrous scrap as defined in claim 45, wherein said commingled flux includes lime, fluorspar, magnetic ferrous particles, 10-40 weight percent aluminum particles, and optionally calcium aluminate particles.

68. The method as defined in claim 46, wherein said commingled flux includes lime, fluorspar, magnetic ferrous particles and one or more particles selected from the group consisting of aluminum particles and calcium aluminate particles.

69. The bale of ferrous scrap as defined in claim 58, wherein said commingled flux includes lime, fluorspar, magnetic ferrous particles, 10-40 weight percent aluminum particles, and optionally calcium aluminate particles.

70. The bale of ferrous scrap as defined in claim 59, wherein said commingled flux includes lime, fluorspar, magnetic ferrous particles, 10-40 weight percent aluminum particles, and optionally calcium aluminate particles.

* * * * *